US009954623B2

(12) United States Patent
Dailey et al.

(10) Patent No.: US 9,954,623 B2
(45) Date of Patent: Apr. 24, 2018

(54) SYSTEM FOR CONTINUOUSLY ACTIVE STABILIZATION OF INTERFEROMETERS IN QUANTUM TIME-BIN ENTANGLEMENT DISTRIBUTION

(71) Applicant: VENCORE LABS, INC., Basking Ridge, NJ (US)

(72) Inventors: James M. Dailey, Basking Ridge, NJ (US); Anjali Agarwal, Basking Ridge, NJ (US); Paul Toliver, Basking Ridge, NJ (US); Nicholas Peters, Basking Ridge, NJ (US)

(73) Assignee: Vencore Labs, Inc., Basking Ridge, NJ (US)

( * ) Notice: Subject to any disclaimer, the term of this patent is extended or adjusted under 35 U.S.C. 154(b) by 0 days.

(21) Appl. No.: 14/959,138

(22) Filed: Dec. 4, 2015

(65) Prior Publication Data

US 2016/0164615 A1 Jun. 9, 2016

Related U.S. Application Data

(60) Provisional application No. 62/088,192, filed on Dec. 5, 2014.

(51) Int. Cl.
*H04B 10/70* (2013.01)
(52) U.S. Cl.
CPC .................................. *H04B 10/70* (2013.01)
(58) Field of Classification Search
CPC ....................................................... H04B 10/70
See application file for complete search history.

(56) References Cited

U.S. PATENT DOCUMENTS

| 2009/0022322 | A1* | 1/2009 | Trifonov | H04L 9/0852 380/278 |
| 2010/0309469 | A1* | 12/2010 | Kanter | H04B 10/70 356/364 |
| 2014/0099104 | A1* | 4/2014 | Peters | H04B 10/70 398/25 |

OTHER PUBLICATIONS

C. Weedbrook, et al., *Guassian Quantum Information*, Review of Modem Physics vol. 84, Issue 2, p. 621, May 1, 2012.
H. Takesue, et al., *Generation of Polarization Entangled Photon Pairs Using Silicon Wire Waveguide*, Optics Express, vol. 16, No. 8, p. 5721, Apr. 14, 2008.
M. Vasilyev, *Distributed Phase-Sensitive Amplification*, Optics Express, vol. 13, No. 19, p. 7563, Sep. 19, 2005.
C.J. McKinstrie, *Phase-Sensitive Amplification in a Fiber*, Optics Express, vol. 12, No. 30, p. 4973, Oct. 4, 2004.
Y.C. Zhang, *Improvement of two-way continuous-variable quantum key distribution using optical amplifiers*, J. Phys. B: At. Mol. Phys. B47, 035501, Feb. 20, 2014.
K. Inoue, *Polarization Independent Wavelength Conversion Using Fiber Four-Wave Mixing with Two Orthogonal Pump Lights of Different Frequencies*, Journal of Lightwave Technology, vol. 12, No. 11, Nov. 1994.

(Continued)

*Primary Examiner* — Shi K Li
(74) *Attorney, Agent, or Firm* — Heslin Rothenberg Farley & Mesiti P.C.

(57) ABSTRACT

Provided are methods and systems for controlling a phase characteristic of entangled photon pairs. The phase characteristic may be a relative phase difference between photons of the entangled photon pair. Also provided are methods and systems for stabilizing distributed interferometers used in quantum communication systems.

17 Claims, 2 Drawing Sheets

(56) References Cited

OTHER PUBLICATIONS

I. Marcikic, et al, *Distribution of Time-Bin Entangled Qubits Over 50LM of Optical Fiber*, Physical Review Letters 93, 180502, Apr. 21, 2014.

X.Y. Zou, et al., *Induced Coherence and Indistinguishability in Optical Interference*, Physical Review Letters, vol. 67, No. 3, p. 318 Jul. 15, 1991.

H. Fan, et al., *Quantum Cloning Machines and the Applications*, Physics Reports, 10.1016/j.physrep., Aug. 2, 2014.

J. Zhang et al., *Phase-Sensitive Manipulations of Squeezed Vacuum Field in an Optical Parametric Amplifier inside an Optical Cavity*, Physical Review Letters, 101, 233602, Nov. 2, 2008.

T.J. Herzog, et al., *Frustrated Two-Photon Creation via Interference*, Physical Review Letters, vol. 72, No. 5, p. 629 Jan. 31, 1994.

J.D. Franson, et al., *Bell Inequality for Position and Time*, Physical Review Letters, vol. 62, No. 19, p. 2205, May 8, 1989.

H. Takesue, et al., *1.5-μm Band Quantum-Correlated Photon Pair Generation in Dispersion-Shifted Fiber: Suppression of Noise Photons by Cooling Fiber*, Optics Express, vol. 13, No. 20, p. 7832, Oct. 3, 2005.

Y. Shang, et al., *Continuous Variable Entanglement Enhancement and Manipulation by a Sub-Threshold Type II Optical Parametric Amplifier*, Optics Letters, vol. 35, Issue 6, p. 853-855, Mar. 6, 2010.

M. Ricci, et al., *Separating the Classical and Quantum Information via Quantum Cloning*, Physical Review Letters, 95, 090504, Aug. 26, 2005.

M. Hall, et al., *Drop-In Compatible Entanglement for Optical-Fiber Networks*, Optics Express, vol. 17, No. 17, p. 14558, Aug. 17, 2009.

S. Fossier, et al., *Improvement of Continuous-Variable Quantum Key Distribution Systems by Using Optical Amplifiers*, Journal of Physics B: Atomic, Molecular and Optical Physics, vol. 42, No. 11, May 15, 2009.

C.J. McKinstrie, et al., *Effects of Transmission on Gaussian Optical States*, Optics Express, vol. 23, No. 8, p. 10856, Apr. 20, 2015.

R.T. Glasser, et al., *Entanglement-Seeded-Dual Optical Parametric Amplification: Applications to Quantum Communication, Imaging, and Metrology*, Physical Review Letters, A 78, 012339, Apr. 10, 2008.

R.C. Pooser, et al., *Low-Noise Amplification of a Continuous Variable Quantum State*, Physical Review Letters, 103, 010501, Jun. 29, 2009.

Y. Shaked, et al., *Observing the Non-Classical Nature of Ultra-Broadband Bi-Photons at Ultrafast Speed*, New Journal of Physics, vol. 16, 053012, Apr. 2, 2014.

H. Zhang, et al., *Improving the Performance of the Four-State Continuous-Variable Quantum Key Distribution by Using Optical Amplifiers*, Physical Review A., American Physical Society, vol. 86, Issue 2, p. 022338, Aug. 29, 2012.

F.W. Sun, et al., *Stimulate Emission as a Result of Multiphoton Interference*, Physical Review A., American Physical Society, vol. 99, Issue 4, p. 043601, Jul. 25, 2007.

P.G. Kwiat, et al., *High-Visibility Interference in a Bell-Inequality Experiment for Energy and Time*, Physical Review A., American Physical Society, vol. 47, Issue 4, p. R2472-R2475, Apr. 1, 1993.

A. Lamas-Linares, et al., *Stiumlated Emission of Polzarization-Entangled Photons*, Letters to Nature, vol. 412, pp. 887-890, Aug. 30, 2001.

X. Li, et al., *Storage and Long-Distance Distribution of Telecommunications-Band Polarization Entanglement Generated in an Optical Fiber*, Optical Letters, vol. 30, Issue 10, p. 1201-1203, May 15, 2005.

A. Agarwal, et al., Propagation of Two-Qubit States using Interference in a Distributed Phase Sensitive Amplifier, OSA Technical Digest (Optical Society of America, 2015).

P. Toliver, et al., Continuously Active Interferometer Stabilization and Control for Time-Bin Entanglement Distribution, Optics Express, vol. 23, No. 4, Feb. 10, 2015.

* cited by examiner

SYSTEM FOR CONTINUOUSLY ACTIVE STABILIZATION OF INTERFEROMETERS IN QUANTUM TIME-BIN ENTANGLEMENT DISTRIBUTION

CROSS-REFERENCE TO RELATED APPLICATIONS

The present application claims the benefit of priority of U.S. Provisional App. No. 62/088,192 filed Dec. 5, 2014, which is incorporated by reference in its entirety.

GOVERNMENT SUPPORT

This invention was made with government support under United States Government DARPA contract number W31P4Q-13-C-0069. The government has certain rights in the invention.

FIELD OF THE INVENTION

The present invention relates to controlling quantum communications in general, and more specifically to methods and systems for controlling interferometers and phase differences in quantum communications.

BACKGROUND

In quantum communications, time-bin entangled qubits may be an attractive choice for transmission over long lengths of optical fiber due to their relative immunity to polarization transmission impairments. However, matched interferometers having the proper alignment of optical phase are required for generating and analyzing these qubits.

BRIEF DESCRIPTION

The shortcomings of the prior art are overcome and additional advantages are provided through the provision, in one aspect, of a method for controlling a phase characteristic of entangled photon pairs. In another aspect, provided herein is a method for controlling interferometers in entanglement-based quantum communications. In a third aspect, provided herein is a system for controlling a phase characteristic of entangled photon pairs. As well, in another aspect, provided herein is a system for controlling interferometers in entanglement-based quantum communications.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages as set forth herein are apparent from the following detailed description taken in conjunction with the accompanying drawings in which:

DETAILED DESCRIPTION

Figure 1:
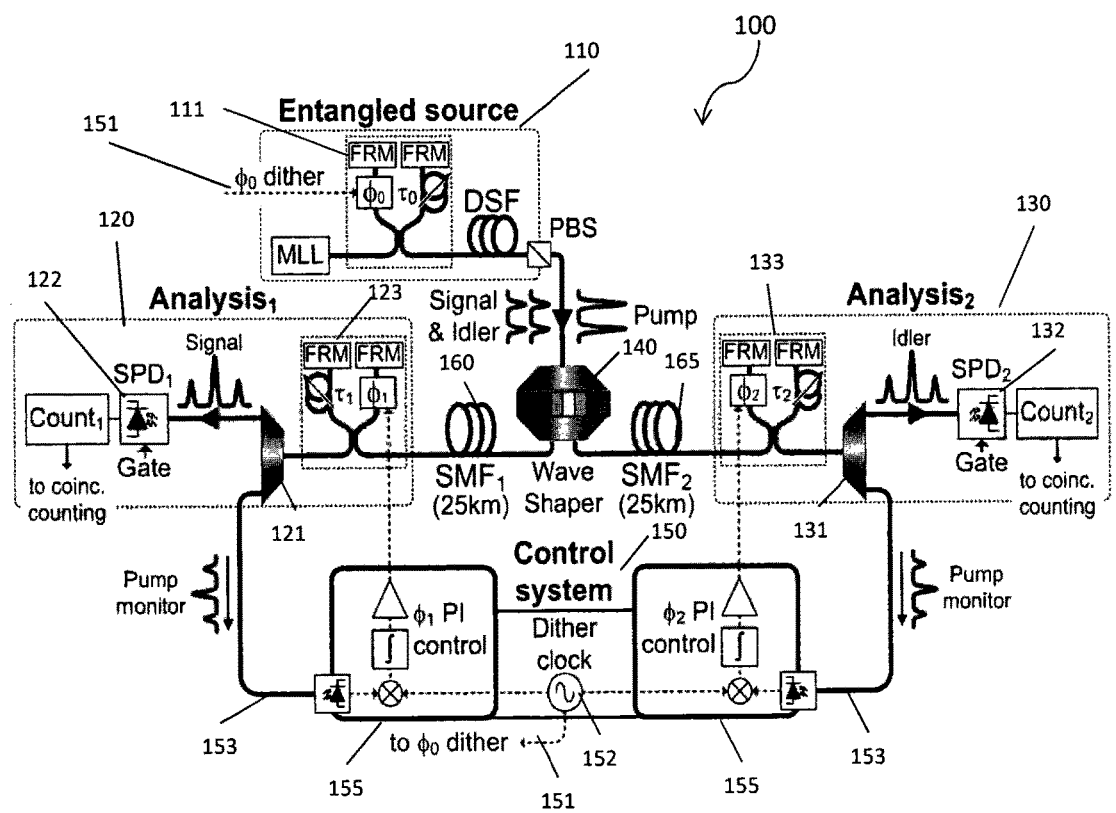
FIG. 1 depicts one embodiment of a system as well as one embodiment of a method for controlling a phase characteristic of an entangled photon pair and stabilizing interferometers in entanglement-based quantum communications.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

In quantum communications, information may be encoded in a variety of degrees of freedom such as polarization, phase, angular momentum, and so on. The two main qubit degrees of freedom which are utilized in fiber are based on optical polarization and phase. Polarization is an excellent qubit for free-space, though in fiber optical networks several polarization-based effects such as polarization dependent loss (PDL) and polarization mode dispersion (PMD) make its use more challenging. Even if PDL and PMD are not a problem, active polarization stabilization or tracking of the entire quantum communications channel is required to successfully transmit polarization qubits (N. Gisin et al., "Quantum Cryptography," Rev. Mod. Phys. 74, p. 145, 2002). To avoid many of the difficulties associated with polarization impairments, the phase difference between adjacent pulses or time-bins has been used in both entanglement-based and prepare-and-measure quantum communications experiments. The temporal separation between pulses is typically much shorter than the time scale of the fiber perturbations, which leads to natural resilience to channel impairments (J. Brendel et al., "Pulsed Energy-Time Entangled Twin-Photon Source for Quantum Communication," Phys. Rev. Lett., 82, p.2594, 1999; I. Marcikic et al., "Time-bin Entangled Qubits for Quantum Communication Created by Femtosecond Pulses", Phys Rev A, 66, p. 062308, 2002). These phase-based protocols can be configured in a polarization insensitive way, but they do require alignment and stabilization of optical interferometers for qubit analysis. Optical interferometers can be implemented in either free-space or wave-guided configurations.

Passive stabilization techniques for phase-based qubits in prepare-and-measure systems have been demonstrated, including the "plug and play" architecture (D. Stucki et al., "Quantum key distribution over 67 km with a plug & play system," New J. Phys. 4, pp. 41.1-41.8, 2002). However, the optical pulses must make a round trip between the users and hence this architecture's performance will be limited relative to one-way systems. (Z. L. Yuan and A. J. Shields, "Continuous operation of a one-way quantum key distribution system over installed telecom fibre," Optics Express, 13, pp. 660-665, 2005). Therefore, the development of active stabilization techniques for one-way quantum communications systems is of great importance. Reported techniques in time-bin entanglement-based systems include active thermal management of photonic integrated circuits (H. Takesue and K. Inoue, "Generation of 1.5-µm band time-bin entanglement using spontaneous fiber four-wave mixing and planar light-wave circuit interferometers," Phys. Rev. A 72, p. 041804(R), 2005) or adding ports and single-photon detectors to interferometer outputs for tomography (S. X. Wang et al., "High speed tomography of time-bin entangled photons using a single measurement setting," Phys. Rev. A 86, p. 042122, 2012). Many of the active techniques involve the injection of an additional reference signal, usually at a wavelength differing from the quantum signal, which is monitored and used to stabilize the interferometers (see, e.g., I. Marcikic et al.; D. Stucki et al.; G. B. Xavier and J. P. von der Weid, "Stable single-photon interference in a 1 km fiber-optical Mach-Zehnder interferometer with continuous phase adjustment," Optics Letters, 36, p. 1764-1766, 2011; S. B. Cho and T. G. Noh, "Stabilization of a long-armed fiber-optic single photon interferometer," Optics Express, 17, p. 19027, (2009); D. Grassani et al., "Active stabilization of a Michelson interferometer at an arbitrary phase with subnanometer resolution," Optics Letters, 39, p. 2530-2533, 2014). Though effective, adding an entirely dedicated control wavelength to the system requires additional optics that results in additional loss, and often the system cannot be stabilized while simultaneously making quantum measurements.

Thus, generally stated, provided herein in one aspect is a method, the method including generating an entangled photon pair with a pair of pump pulses, and re-using the pump pulses to align the entanglement analysis interferometers relative to the entanglement source interferometer. Also provided herein, in another aspect, is a system including a source pump capable of producing an entangled photon pair with a pair of pump pulses, and a photo-detector capable of receiving the pump pulses to align the entanglement analysis interferometers relative to the entanglement source interferometer.

More specifically, the methods and systems provided herein describe techniques for actively locking the relative phases of three time-bin interferometers in a manner suitable for quantum communication systems. In exemplary embodiments, time-bin entangled photon pairs may be generated using a pair of pump pulses, such as may be generated by a source pump laser and entanglement source interferometer, and the pair of pump pulses may be used by the control system to stabilize the entanglement analysis interferometers. Advantageously, the technique may be achieved through a system that includes classical detectors, such as low-speed photo-detectors. Furthermore, the entanglement analysis interferometers may be continuously stabilized during quantum communications, advantageously improving potential throughputs by eliminating the need to stop transmission to allow for a tuning period (see, e.g., R. J. Hughes, et al., "A quantum key distribution system for optical fiber networks", Proc. SPIE 5893, Quantum Communications and Quantum Imaging III, 589301, 2005). The methods and systems described herein make use of the coexistence of classical and quantum signals as the pump pulses are maintained at a relatively large power level compared to the co-propagating entangled photon pairs (see, e.g., N. A. Peters et al., "Dense wavelength multiplexing of 1550 nm QKD with strong classical channels in reconfigurable networking environments," New J. Phys. 11, p. 045012, 2009). In exemplary embodiments, there may be approximately eight orders of magnitude difference between the quantum and classical signal strengths. Despite the presence of the relatively intense co-propagating pump pulses, the quality of transmitted entangled photons may only be slightly degraded over a fiber-optic end-to-end link. This approach to interferometer stabilization was first introduced over a single 5-km fiber (see Appendix C), but as detailed herein the technique and system may stabilize entangled photon pairs in two independent fiber links over a total end-to-end length of at least 50 km.

FIG. 1 depicts one embodiment of a system 100, as well as one embodiment of a method, for stabilizing a phase characteristic of the distributed interferometric system. One entanglement source interferometer 111 and two entanglement analysis interferometers 123, 133 are utilized to generate and analyze time-bin qubits. Each interferometer 111, 123, 133 employs a tunable delay line in one arm ($\tau_0, \tau_1, \tau_2$) so the relative path-length delays of all three interferometers can be coarsely aligned to each other. The $\tau_1$ and $\tau_2$ delays may also be varied to provide a controlled differential phase shift between the two paths of each analysis interferometer, which enable two-qubit analysis. A phase shifter, such as a piezo-based fiber phase shifter, in each interferometer allows for fine phase control in the interferometer to provide the active stabilization.

The entanglement source interferometer 111 splits picosecond pulses from a fiber-based passively mode-locked laser (approximately 1550 nm, approximately 50 MHz repetition rate) into two pulses that are time delayed by approximately 5 ns with a relative phase shift of $\phi_0$. The double pulses are used to pump a short length of dispersion-shifted fiber (DSF), which creates time-bin entangled signal-idler photon pairs. The pump power may be chosen to minimize multi-photon pair emission (measured mean photon pair creation probability at source output may be, for example, $\sim 4 \cdot 10^{-3}$ per pump pulse). Photon pairs may be created with equal probability by either pump pulse, corresponding to early and late time-bins. To reduce accidental coincidences arising from spontaneous Raman scattering in the DSF, the fiber may be cooled by submersion in liquid nitrogen (see, e.g., H. Takesue and K. Inoue, "1.5-µm band quantum-correlated photon pair generation in dispersion-shifted fiber: suppression of noise photons by cooling fiber," Optics Express, Vol. 13, Issue 20, pp. 7832-7839, 2005). A polarizer is also utilized to suppress cross-polarized spontaneous Raman noise from the source DSF. A waveshaper 140, such as a Finisar Waveshaper optical filter, routes the signal photons to the first 25-km fiber spool ($SMF_1$) 160 and the idler photons to the second 25-km fiber ($SMF_2$) 165. The signal and idler photons may be chosen to be approximately ±400 GHz (±3.2 nm) from the central pump wavelength. The pump is also split and injected into each fiber along with the quantum signals. The waveshaper may, for example, provide approximately 30 dB of additional loss to the pump only, so that approximately −42 dBm of pump power enters each of the two fiber spools.

Previous experiments have used fiber with low dispersion at the transmission wavelengths to minimize the pulse spreading and maintain good visibility at the output (e.g., I. Marcikic et al.). In exemplary embodiments, however, fiber spools 160, 165 may be, for instance, standard single-mode fiber (such as Corning SMF 28) with approximately 17 ps/nm/km dispersion at 1560 nm and total loss per spool of approximately 6 dB. As the pulse bandwidths may be relatively small, corresponding to pulsewidths of a few picoseconds, and the time-bin separation (approximately 5 ns) may be sufficiently larger than the pulse width; inter-time-bin crosstalk arising from chromatic dispersion may be avoided.

After passing through the fiber, the signal and idler photons, along with the co-propagating pump pulse, pass through respective entanglement analysis interferometers 123, 133. At this point both the signal and the pump (from SMF$_1$) accumulate phase shifts of $\phi_1$, and the idler along with the pump (from SMF$_2$) accumulate phase shifts of $\phi_2$ from these interferometers. The pump pulses are filtered from the interferometer outputs using a double cascade of standard telecom thin-film filters 121, 131 with 0.5 dB and 3 dB bandwidths of approximately 0.9 nm and 1.1 nm, respectively, providing greater than 80 dB of pump suppression. The filtered pump pulses may be routed to photodetectors 153 of the stabilization control system 150, while the signal and idler photons are measured using, for example, avalanche photodiode single-photon detectors (SPD) 122, 132. The detection events from the SPDs may then be analyzed in coincidence for characterization purposes or used as part of a quantum communications protocol.

Note that all of the interferometers relative phase shifts, $\phi_0$, $\phi_1$, and $\phi_2$ may drift with time due to changing thermal or other environmental conditions. The stabilization systems and methods described herein align the relative phase of the entanglement analysis interferometers with respect to the phase of the source interferometer phase $\phi_0$ so that the correct phase reference frame for proper entanglement measurements can be established.

The stabilization control system 150 injects a low-frequency (approximately 1 kHz) and low-amplitude dither signal 151 into the entanglement source interferometer 111, which adds a small phase modulation in addition to the quasi-static $\phi_0$. This low-frequency modulation may be chosen high enough so that the control system integration time is sufficiently shorter than the time scale of the phase fluctuations, which are typically on the order of a second in fiber-based interferometers, for example. Because the path length delays in each entanglement analysis interferometer are significantly greater than the pulse width, three copies of the pump pulse may exit the entanglement analysis interferometers. The second timeslot is where the quantum two-photon interference is observed and is exclusively selected using the SPD 122, 132 gating window. The pump pulses exhibit classical interference in the second timeslot, and the phase dither introduced on the entanglement source interferometer is converted into an amplitude modulation, which is detected by the classical photodetectors 153. For simplicity, the classical detector may be described as integrating all three copies of the pump pulse; the DC offset resulting from the first and last pump pulses may be later rejected in the control system. The closed-loop control system monitors the recovered amplitude modulation produced as a result of the 1 kHz dither signal 151 using synchronous demodulation, which is accomplished by mixing the dither tone clock 152 with the recovered signals from the photodetectors 153, both of which are locked in phase. The signal may be integrated over a 34-ms window, which may be sufficiently short to track and compensate fiber phase fluctuations and provide stable, high visibility measurements. The phase shifters in the entanglement analysis interferometers 123, 133 are adjusted appropriately to minimize the recovered dither signal amplitude, which serves as an error signal in the control loop.

A standard proportional-integral (PI) control (see, e.g., F. Golnaraghi and B. C. Kuo, Automatic Control Systems, 9th Edition. John Wiley & Sons, Inc., 2009) can be used in exemplary embodiments because the dithering process produces a signal proportional to the slope of the cascaded interferometer output response. This signal may go to zero at either the minimum or maximum of an interference fringe and changes sign on either side of it. Also, given that the control algorithm may be minimizing the recovered dither tone at either the minimum or maximum as opposed to setting it to a fixed value, no power calibration may be required. The resulting pump signal can be configured to either a maximum or minimum of an interference fringe by setting the closed-loop proportional feedback gain to either a positive or negative value, respectively. The result is that the cascaded source-signal and source-idler interferometers pairs may be simultaneously maintained at either a minimum or maximum transmission at the pump wavelength. Depending upon the setting of the tunable delay lines ($\tau_1$, $\tau_1$, $\tau_2$), the transmission at the signal and idler wavelengths may be different than that for the pump wavelength. This transmission difference corresponds to phase shift offset that can be used to scan two-photon interference fringes for entanglement usage and characterization. These phase offsets may be adjusted using the interferometer time delays, as described further herein.

The coincidence counting rate for time-bin entangled pairs is given by the following expression (I. Marcikic et al.; H. Takesue and K. Inoue):

$$R_{CC} \propto \tfrac{1}{2}\{1+V\cos[(\phi_S-\phi_P)+(\phi_I-\phi_P)]\}$$

where $R_{CC}$ and V are the coincidence counting rate and visibility, respectively. The terms ($\phi_S-\phi_P$) and ($\phi_I-\phi_P$) correspond to the effective relative phase shifts experienced at each of the signal (S) and idler (I) wavelengths between their respective entanglement analysis interferometers 123, 133 and the common entanglement source (pump) interferometer (P) 111. Given the pump pulse is much shorter than delays used within the interferometers, the effective relative phase shift experience within the source-signal 111-123 and source-idler interferometer 111-133 cascades can be expressed as:

$$(\phi_S-\phi_P)=\omega_S(\tau_1-\tau_0)+(\phi_1-\phi_0)$$

$$(\phi_I-\phi_P)=\omega_I(\tau_2-\tau_0)+(\phi_2-\phi_0)$$

where $\tau_0$, $\tau_1$, and $\tau_2$ are the absolute time delays in the pump, signal-analysis, and idler-analysis interferometers respectively, $\phi_0$, $\phi_1$, and $\phi_2$ are the corresponding absolute phase shifts, and $\omega_S$, $\omega_I$ are the signal and idler frequencies. When the control system is configured to lock the source-signal 111-123 and source-idler 111-133 interferometers for maximum interference at the pump frequency ($\omega_P$), the following conditions are held:

$$\omega_P(\tau_1-\tau_0)+(\phi_1-\phi_0)=2\pi m$$

$$\omega_P(\tau_2-\tau_0)+(\phi_2-\phi_0)=2\pi m$$

where m is an integer. Here, it is assumed that phase shifts $\phi_0$, $\phi_1$, and $\phi_2$ experienced by the pump are equal to that experienced by either the signal or idler, which may be reasonable given the fractional wavelength difference is only ±0.2%. Defining $\omega_S \equiv \omega_P-\Delta\omega$ and $\omega_I \equiv \omega_P+\Delta\omega$, the following conditions will be enforced at the signal and idler wavelengths:

$$(\phi_S-\phi_P)=-\Delta\omega(\tau_1-\tau_0)+2\pi m$$

$$(\phi_I-\phi_P)=-\Delta\omega(\tau_2-\tau_0)+2\pi m$$

from which the coincidence counting rate can simply be rewritten as:

$$R_{CC} \propto \tfrac{1}{2}(1+V\cos[\Delta\omega\cdot(\tau_2-\tau_1)]).$$

As a result, by changing the relative delay in either of the entanglement analysis interferometers 123, 133, the two-photon interference fringe may be scanned. In order to ensure accurate visibility measurements, the pulse temporal width should be greater than the time delay scanning range. The observed fringe period may be, in one instance, approximately 2.8 ps, which is less than the estimated pulse width.

Figure 2A:
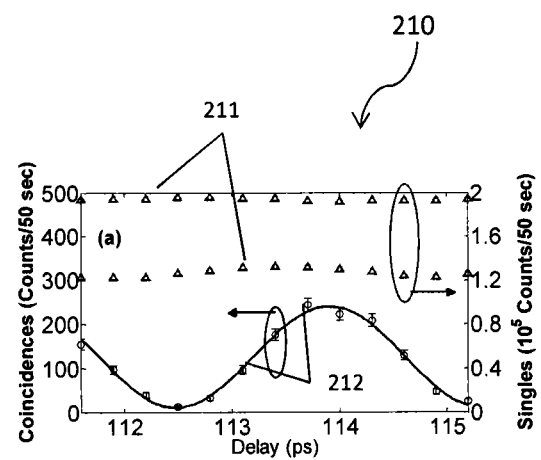
FIG. 2A is a chart detailing experimental data collected at the output of an entangled source of a system for stabilizing interferometers in entanglement-based quantum communications.
Figure 2B:
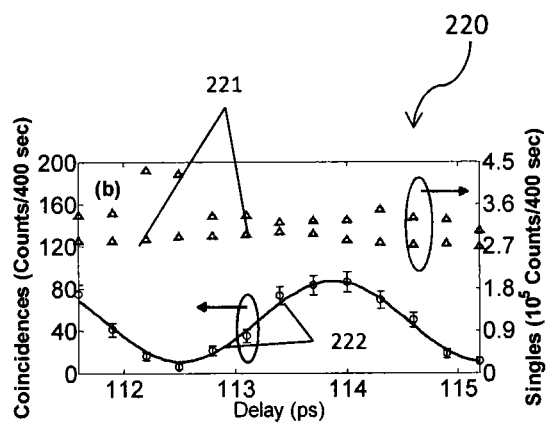
FIG. 2B is a chart detailing experimental data collected after the entangled photons are transmitted over 50 km using a system for stabilizing interferometers in entanglement-based quantum communications, in accordance with one or more aspects of the present invention.

As discussed below, the systems and methods described herein may apply where, for example, the SMF fiber links 160, 165 are about 25 km each, with one photon of each entangled photon pair is transmitted down a different fiber link 160 or 165, so that the total separation between analysis interferometers 120, 130 is about 50 km. This distance is significant because the 25 km length is very close to where one would expect to observe the maximum impact of Raman scattering from the co-propagating classical pump used for stabilization (see N. A. Peters, et al.). FIG. 2A is a chart 210 depicting a sample of raw counting rates plotted for the source output in a 50-s counting interval. FIG. 2B is a chart 220 depicting another sample of raw counting rates plotted for the output after transmission through 50 km in a 400 s counting interval. Accidental coincidences are not subtracted in these charts. In both FIG. 2A and FIG. 2B, triangles 211, 221 indicate singles counting rates, and circles 212, 222 indicate the coincidence counting rates.

In order to measure the two-photon interference, only one entanglement analysis interferometer delay may need to be scanned. The other interferometer may also be adjusted if more than one measurement basis is desired (see, e.g., A. Agarwal, J. M. Dailey, P. Toliver, and N. A. Peters, "Entangled-pair transmission improvement using distributed phase-sensitive amplication," *Phys. Rev. X,* 4 041038 2014). As illustrated in FIGS. 2A-2B, the singles counts 211, 221 show little variation with applied phase shift. The circles 212, 222 show how the coincidence counting rates vary with delay. The fit to the data collected immediately after the source yields visibility of 91%±3%. After the entangled photons propagate over 50 km of fiber, the visibility is 83%±5%. Due to fiber loss, the measurement interval is increased from 50 s at the source to 400 s after 50 km to have similar statistical errors. The measured visibilities exceed the approximately 70.7% threshold for entanglement by 7 and 2 standard deviations, respectively.

Provided are methods and systems for controlling a phase characteristic of entangled photon pairs. The phase characteristic may be a relative phase difference between photons of the entangled photon pair. Also provided are methods and systems for stabilizing distributed interferometers used in quantum communication systems. A system may be configured to generate an entangled photon pair with one or more pump pulses, and use the pump pulse(s) to control or lock the relative phase difference of analysis interferometers relative to the entanglement source interferometer for the entangled photon pair. The pump pulse may be generated by a source pump, routed along with individual photons of the photon pair to interferometers that further route the pump pulse to a photodetector(s). The photodetector may be configured to recover a signal synchronized to a dither signal that can be used to generate interferometer correction signals that may be routed to the interferometers.

In one embodiment, there are provided methods and systems for controlling the measurement phase characteristic of entangled time-bin qubits. In one embodiment, the phase characteristic may be a relative phase difference between the qubit's time-bins.

Additional aspects of apparatus, systems and methods herein are set forth in Appendix A entitled "Loss resilience for two-qubit state transmission using distributed phase sensitive amplification" which is appended hereto and which forms part of the present disclosure.

Additional aspects of apparatus, systems and methods herein are set forth in Appendix B entitled "Entangled-pair transmission improvement using distributed phase-sensitive amplification" which is appended hereto and which forms part of the present disclosure.

Additional aspects of apparatus, systems and methods herein are set forth in Appendix C entitled "Active Stabilization and Continuous Phase Control of Time-bin Entanglement Interferometers" which is appended hereto and which forms part of the present disclosure.

Additional aspects of apparatus, systems and methods herein are set forth in Appendix D entitled "Loss resilience for two-qubit state transmission using distributed phase sensitive amplification," which is appended hereto and which forms part of the present disclosure.

Additional aspects of apparatus, systems and methods herein are set forth in Appendix E entitled "Continuously active interferometer stabilization and control for time-bin entanglement distribution" which is appended hereto and which forms part of the present disclosure.

While several aspects have been described and depicted as set forth herein, alternative aspects may be effected by those skilled in the art to accomplish the same objectives. Accordingly, it is intended by the appended claims to cover all such alternative aspects as fall within the true spirit and scope of the invention.

A small sample of methods and apparatus set forth herein include:

A1. A method comprising generating an entangled photon pair with a pump pulse, and using the pump pulse to control a phase characteristic of the entangled photon pair. A2. The method of A1, wherein the phase characteristic is a relative phase difference between photons of the entangled photon pair. A3. The method of A2, further comprising combining the pump pulse with a reference signal to facilitate locking the relative phase difference. A4. The method of A3, further comprising routing a first copy of the pump pulse and one photon of the entangled photon pair to a first analysis interferometer, routing a second copy of the pump pulse and the other photon of the entangled photon to a second analysis interferometer, and routing the first and second copies of the pump pulse to a photo-detector. A5. The method of A4, wherein the photo-detector generates the reference signal and combines the copies of the pump pulse with the reference signal to generate a first correction signal and a second correction signal. A6. The method of A5, further comprising transmitting the first correction signal to the first analysis interferometer and transmitting the second correction signal to the second analysis interferometer to facilitate locking the relative phase difference. A7. The method of A5, further comprising using the reference signal to facilitate generating the entangled photon pair with the pump pulse.

B1. A system comprising: a source pump capable of producing an entangled photon pair with a pump pulse; and, a photo-detector capable of receiving the pump pulse and combining the pump pulse with a reference signal to facilitate controlling a phase characteristic of the entangled photon pair. B2. The system of B1, wherein the phase characteristic is a relative phase difference between photons of the entangled photon pair. B3. The system of B2, further comprising a first analysis interferometer and a second analysis interferometer, the first analysis interferometer capable of receiving a first copy of the pump pulse and one photon of the entangled photon pair, the second analysis interferometer capable of receiving a second copy of the pump pulse and the other photon of the entangled photon pair, and the first and second analysis interferometers capable of transmitting the first and second copies of the pump pulse to the photo-detector. B4. The system of B3, wherein the photo-detector generates the reference signal, and wherein the photo-detector combines the reference signal with the first copy of the pump pulse to generate a first correction signal and combines the second copy of the pump pulse with the reference signal to generate a second correction signal. B5. The system of B4, wherein the photo-detector is configured to transmit the first correction signal to the first analysis interferometer and to transmit the second correction signal to the second analysis interferometer. B6. The system of B4, wherein the photo-detector is configured to transmit the reference signal to the source pump, and the source pump is configured to use the reference signal to facilitate producing the entangled photon pair and the pump pulse.

C1. A method comprising generating correlated photons with one or more pump pulses, and using the pump pulses to control interferometers in quantum communications. C2. The method of C1, wherein the entanglement analysis interferometers are controlled by aligning their relative phase with respect to the entanglement source interferometer used in the generation of pump pulses. C3. The method of C2, further comprising dithering the phase of one of the entanglement source pump pulses with a dither clock signal to facilitate locking the relative phase difference. C4. The method of C3, further comprising routing a first copy of the pump pulses and one photon of the entangled photon pair to a first entanglement analysis interferometer, routing a second copy of the pump pulses and the other photon of the entangled photon pair to a second entanglement analysis interferometer, and routing the resulting pump pulse interference signal produced at the output of the entanglement analysis interferometers to photo-detectors. C5. The method of C4, wherein the photo-detectors recover an amplitude modulated signal synchronized to the dither signal that can be used to generate a first correction signal and a second correction signal. C6. The method of C5, further comprising transmitting the first correction signal to the first entanglement analysis interferometer and transmitting the second correction signal to the second entanglement analysis interferometer to facilitate locking the relative phase difference with respect to the entanglement source interferometer.

D1. A system comprising: a source capable of producing correlated photon pairs with one or more pump pulses; and, a pair of entanglement analysis elements capable of receiving copies of the pump pulses and recovering a dither signal to facilitate controlling interferometers for entanglement-based quantum communications. D2. The system of D1, wherein the entanglement analysis interferometers are controlled by aligning their relative phase with respect to the entanglement source interferometer used in the generation of one or more pump pulses. D3. The system of D2, further comprising a first entanglement analysis interferometer and a second entanglement analysis interferometer, the first entanglement analysis interferometer capable of receiving a first copy of the pump pulses and one photon of the entangled photon pair, the second analysis interferometer capable of receiving a second copy of the pump pulses and the other photon of the entangled photon pair, and the first and second analysis interferometers capable of transmitting the first and second copies of the pump pulses to photo-detectors. D4. The system of D3, wherein the photo-detectors recover an amplitude modulated signal synchronized to the dither signal that can be used to generate a first correction signal and combines the second copy of the pump pulse with the reference signal to generate a second correction signal. D5. The system of D4, wherein the control system is configured to transmit the dither signal to the entanglement source interferometer. D6. The system of D4, wherein the control system is configured to transmit the first correction signal to the first entanglement analysis interferometer and to transmit the second correction signal to the second entanglement analysis interferometer.

What is claimed is:

1. A method comprising:
   generating correlated photons with one or more pump pulses; and
   using the one or more pump pulses to control an interferometer in quantum communications, wherein the interferometer receives a photon of an entangled photon pair, wherein the using the one or more pump pulses to control an interferometer in quantum communications includes using the one or more pump pulses to control entanglement analysis interferometers in quantum communications, wherein the entanglement analysis interferometers are controlled by aligning their relative phase with respect to an entanglement source interferometer used in the generation of one or more copies of input pump pulses.

2. The method of claim 1, further comprising dithering a phase of one of the entanglement source pump pulses with a dither clock signal to facilitate locking a relative phase difference.

3. The method of claim 2, further comprising routing a first copy of the pump pulses and one photon of an entangled photon pair to a first entanglement analysis interferometer, routing a second copy of the pump pulses and the other photon of the entangled photon pair to a second entanglement analysis interferometer, and routing a resulting pump pulse interference signal produced at an output of the entanglement analysis interferometers to a photo-detector.

4. The method of claim 3, wherein the photo-detector recovers an amplitude modulated signal synchronized to the dither signal that can be used to generate a first correction signal and a second correction signal.

5. The method of claim 4, further comprising transmitting the first correction signal to the first entanglement analysis interferometer and transmitting the second correction signal to the second entanglement analysis interferometer to facilitate locking the relative phase difference with respect to the entanglement source interferometer.

6. A system comprising:
   a source capable of producing correlated photon pairs with one or more pump pulses; and
   a pair of entanglement analysis elements capable of receiving copies of the pump pulses and recovering a dither signal to facilitate controlling an interferometer for entanglement-based quantum communications.

7. The system of claim 6, wherein the controlling an interferometer includes controlling entanglement analysis interferometers by aligning their relative phase with respect to an entanglement source interferometer used in the generation of one or more pump pulses.

8. The system of claim 7, wherein the entanglement analysis interferometers include a first entanglement analysis interferometer and a second entanglement analysis interferometer, the first entanglement analysis interferometer capable of receiving a first copy of the pump pulses and one photon of an entangled photon pair, the second entanglement analysis interferometer capable of receiving a second copy of the pump pulses and the other photon of the entangled photon pair, and the first and second entanglement analysis interferometers capable of transmitting the first and second copies of the pump pulses to a photo-detector.

9. The system of claim 8, wherein the photo-detector recovers an amplitude modulated signal synchronized to the dither signal that can be used to generate a first correction signal and combines the second copy of the pump pulse with a reference signal to generate a second correction signal.

10. The system of claim 9, wherein the system includes a control system that is configured to transmit the dither signal to an entanglement source interferometer.

11. The system of claim 10, wherein the system includes a control system that is configured to transmit the first correction signal to the first entanglement analysis interferometer and to transmit the second correction signal to the second entanglement analysis interferometer.

12. A system comprising:
 a source producing correlated photon pairs with one or more pump pulses; and
 a pair of entanglement analysis elements receiving copies of the pump pulses and recovering a dither signal to facilitate controlling an interferometer for entanglement-based quantum communications.

13. The system of claim 12, wherein the controlling an interferometer includes controlling entanglement analysis interferometers by aligning their relative phase with respect to an entanglement source interferometer used in the generation of one or more pump pulses.

14. The system of claim 13, wherein the entanglement analysis interferometers include a first entanglement analysis interferometer and a second entanglement analysis interferometer, the first entanglement analysis interferometer receiving a first copy of the pump pulses and one photon of an entangled photon pair, the second entanglement analysis interferometer receiving a second copy of the pump pulses and the other photon of the entangled photon pair, and the first and second entanglement analysis interferometers transmitting the first and second copies of the pump pulses to a photo-detector.

15. The system of claim 14, wherein the photo-detector recovers an amplitude modulated signal synchronized to the dither signal that can be used to generate a first correction signal and combines the second copy of the pump pulse with a reference signal to generate a second correction signal.

16. The system of claim 15, wherein the system includes a control system that is configured to transmit the dither signal to an entanglement source interferometer.

17. The system of claim 16, wherein the system includes a control system that is configured to transmit the first correction signal to the first entanglement analysis interferometer and to transmit the second correction signal to the second entanglement analysis interferometer.

* * * * *